(12) United States Patent
Brockett et al.

(10) Patent No.: US 7,412,385 B2
(45) Date of Patent: Aug. 12, 2008

(54) SYSTEM FOR IDENTIFYING PARAPHRASES USING MACHINE TRANSLATION

(75) Inventors: Christopher J. Brockett, Bellevue, WA (US); William B. Dolan, Kirkland, WA (US); Christopher B. Quirk, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 897 days.

(21) Appl. No.: 10/706,102

(22) Filed: Nov. 12, 2003

(65) Prior Publication Data

US 2005/0102614 A1 May 12, 2005

(51) Int. Cl.
*G06F 7/00* (2006.01)
*G06F 17/27* (2006.01)
*G10L 15/00* (2006.01)
*G10L 15/06* (2006.01)

(52) U.S. Cl. .............. 704/245; 704/9; 704/10; 707/1

(58) Field of Classification Search .......... 704/10, 704/245

See application file for complete search history.

(56) References Cited

U.S. PATENT DOCUMENTS

2003/0033279 A1* 2/2003 Gibson et al. ............ 707/1

OTHER PUBLICATIONS

EP Search Report for Application No. 04.024 785.0 dated Apr. 18, 2006.

D. Yarowsky, "Word-Sense Disambiguation Using Statistical Models of Roget's Categories Trained on Large Corpora", In Proceedings, Coling-1992 pp. 1-11.

W. Gale et al., "A Program for Aligning Sentences in Bilingual Corpora", Computational Linguistics, 1994 pp. 1-30.

P. Brown et al., "The Mathematics of Statistical Machine Translation: Parameter Estimation", Association for Computation Linguistics, vol. 19, No. 2, 1993, pp. 263-311.

C. Quirk et al., "Monolingual Machine Translation for Paraphrase Generation", Natural Language Processing Group, Processing of the 2004 Conf. On Empirical Methods . . . , 2004, pp. 1-8.

R. Barzilay et al., "Extracting Paraphrases from a Parallel Corpus", Computer Science Dept., Annual Mtg. Assoc. for Computational Linguistics, 2001, pp. 1-8.

R. Barzilay et al., "Learning to Paraphrase: An Unsupervised Apprpoach Using Multiple-Sequence Alignment" Proceedings of HLT-HAACL 2003, May-Jun. 2003, pp. 16-23.

Stalls et al., Translating Names and Technical Terms in Arabic Text:, In Proceedings of the ACL Workshop on Computational Approaches in Semitic Languages, 1998, pp. 1-8.

Brill et al., "Automatically Harvesting Katakana-English Term Pairs from Search Engine Query Logs", In Proceedings of the Sixth Language Processing Pacific Rim Symposium, NLPRS, 2001 pp. 393-399.

(Continued)

*Primary Examiner*—David R. Hudspeth
*Assistant Examiner*—Justin W Rider
(74) *Attorney, Agent, or Firm*—Westman, Champlin & Kelly, P.A.

(57) ABSTRACT

The present invention obtains a set of text segments from a cluster of different articles written about a common event. The set of text segments is then subjected to textual alignment techniques to identify paraphrases from the text segments in the text. The invention can also be used to generate paraphrases.

7 Claims, 5 Drawing Sheets

OTHER PUBLICATIONS

B. Dolan, "Unsupervised Construction of Large Paraphrase Corpora: Exploiting Masively Parallel News Sources", Proceedings of the 20th Int'l Conf, 2004 pp. 1-7.

D. Lin et al., "DIRT—Discovery of Inference Rules from Text", www.cs.ualberta.ca/~lindek/minipar.htm, 2001, pp. 1-6.

Y. Shinyama, "Automatic Paraphrase Acquisition from News Articles", Proceedings of Human Language Technology Conf. 2002, pp. 1-6.

B. Pang et al., "Syntax-based Alignment of Multiple Translations: Extracting Paraphrases and Generating New Sentences", HLT-NAACL Main Proceedings, 2003 pp. 181-188.

A. Ibrahim, "Extracting Paraphrases from Aligned Corpora", Submitted to the Dept. of Electrical Engineering and Computer Science, Aug. 2002, pp. 2-60.

Japanese Patent Application No. 2004-316990 first Official Notice of Rejection dated Oct. 30, 2007, 5 pages.

C. Quirk et al.; "Dependency Treelet Translation: Syntactically Informed Phrasal SMT," *Proceedings of the 43rd Annual Meeting of the ACL*, Association for Computer Linguistics, Ann Arbor, Jun. 2005, pp. 271-279.

Ringger & Allen, Eric K. & James F.; "A Fertility Channel Model for Post-Correction of Continuous Speech Recognition," Proc. of the 4th International Conference on Spoken Language Processing (ICSLP'96), Philadelphia, PA. Oct. 1996, pp. 1-4.

Kang, B.J. & Choi, K.S.; "Automatic Transliteration and Back-Transliteration by Decision Tree Learning," Proceedings of 2nd International Conference on Language Resources and Evaluation, Athens, Greece May-Jun. 2000, pp. 1135-1141.

Shinyama, Y.; Satoshi, S.; & Sudo, K.; "Automatic Paraphrase Acquisition from News Articles," Dept. of Computer Science, NY University, Proceedings of Human Language Technology Conference 2002, pp. 40-46.

K.S. Jeong et al.; "Automatic Indentification and Back-Transliteration of Foreign Words for Information Retrieval," *Information Processing and Management*: An International Journal, Oxford, NY, Pergamon Press. 1999, pp. 523-540.

Dolan, W.; Quirk, C.; & Brockett, C.; "Unsupervised Construction of Large Paraphrase Corpora : Exploiting Massively Parallel News Source," *Proceedings of COLING 2004*, Geneva Switzerland, pp. 1-7.

Glover-Stalls, B. & Knight, K.; "Translating Names and Technical Terms in Arabic Text," Proceedings of the COLING/ACL Workshop on Computational Linguistics, 1998, 8 pgs.

Knight, K. & Graehl, J.; "Machine Transliteration," Proc. of the 35th Annual Meeting of the Association for Computational Linguistics, 1997. pp. 128-135.

Wang, Y.Y. & Waibel, A.; "Decoding Algorithm in Statistical Machine Translation," Proc. of 35th Annual Meeting of the Association of Computational Linguistics, 1997, 7 pgs.

Al-Onaizan, Y. & Knight, K.; "Machine Transliteration of Names in Arabic Text," Proc. Of ACL Workshop on Computational Approaches to Semitic Languages, 2002, 12 pages.

Kang, B.J. & Choi, K.S.; "English-Korean Automatic Transliteration/Back-transliteration System and Character Alignment," The 38th Annual Meeting of the Association for Computational Linguistics, Oct. 2000, 2 pgs.

Al-Onaizan, Y. & Knight, K.; "Translating Named Entities Using Monolingual and Bilingual Resources," Proc. Of the 40th Annual Meeting of the Assoc. for Computational Linguistics, Philadelphia, PA, Jul. 2002, pp. 400-408.

Virga, P. & Khudanpur, S.; "Transliteration of Proper Names in Cross-Lingual Information Retrieval," Proc. Of the ACL Workshop on Multilingual Named Entity Recognition, 2003, 8 pgs.

* cited by examiner

SYSTEM FOR IDENTIFYING PARAPHRASES USING MACHINE TRANSLATION

BACKGROUND OF THE INVENTION

The present invention deals with identifying paraphrases in text. More specifically, the present invention deals with using machine translation techniques to identify and generate paraphrases.

The recognition and generation of paraphrases is a key facet to many applications of natural language processing systems. Being able to identify that two different pieces of text are equivalent in meaning enables a system to behave much more intelligently. A fundamental goal of work in this area is to produce a program that will be able to restate a piece of text while preserving its semantic content while manipulating features like vocabulary, word order, reading level, and degree of conciseness.

One exemplary application which can benefit from paraphrase identification and generation includes a question answering system. For example, consider a question "When did John Doe quit his job?" where the entity "John Doe" is a famous person. It is very likely that a large data corpus, such as a global computer network (or a news reporting system that publishes articles on a global computer network) may already contain text that answers the question. In fact, such a corpus may already contain text that answers the question and is phrased in exactly the same terms as the question. Therefore, a conventional search engine may have no difficulty in finding text that matches the question, and thus returning an adequate result.

However, this problem becomes much more difficult when searching a smaller data corpus, such as one found on an intranet. In that case, even though the small data corpus may contain text that answers the question, the answer may be phrased in different terms than the question. By way of example, the following sentences all answer the question set out above, but are phrased in different terms than the question:

John Doe resigned yesterday.
John Doe left his position yesterday.
John Doe left his government post yesterday.
John Doe stepped down yesterday.
Yesterday, John Doe decided to explore new career challenges.

Since these answers are phrased differently than the question, a conventional search engine may likely encounter difficulty in returning a good result, given only these textual answers in the corpus which it is searching.

Prior systems for addressing the problem of recognition and generation of paraphrases include large hand-coded efforts that attempt to address the problem in limited contexts. For example, large hand-coded systems attempt to map between a wide variety of different ways of saying the same thing and a form acceptable to a command and control system. Of course, this is extremely difficult because the author of the code likely cannot think of every different way a user might phrase something. Therefore, the focus in the research community has shifted from manual efforts to automatic methods of paraphrase identification and generation.

Recent work on systems aimed at automatically identifying textual paraphrase relations includes D. Lin and P. Pantel, *DIRT-DISCOVERY OF INFERENCE RULES FROM TEXT*, Proceedings of ACMSIGKDD Conference on Knowledge Discovery and Data Mining, pages 323-328 (2001). The DIRT article examines the distributional properties of dependency paths linking identical "anchor points" (i.e. identical or similar words) in a parsed corpus of newswire data. None of the special properties of news data are exploited since the parsed corpus is simply viewed as a large source of monolingual data. The basic idea is that high frequency dependency graph paths which link identical or similar words are themselves likely to be similar in meaning. When run over a gigabyte of newspaper data, the system identified patterns such as:

X is resolved by Y.
X resolves Y.
X finds a solution to Y.
X tries to solve Y.

The DIRT system has been limited to a very restricted sort of "triple" relation, such as "X verb Y".

Another article that deals with paraphrase identification is Y. Shinyama, S. Sekine, K. Sudo and R. Grisham, *AUTOMATIC PARAPHRASE ACQUISITION FROM NEWS ARTICLES*, Proceedings of Human Language Technology Conference, San Diego, Calif. (HLT 2002). In the Shinyama et al. article, the observation is made that articles from different newspapers that describe the same event often exemplify paraphrase relations. The paper describes a technique that relies on the assumption that named entities (such as people, places, dates and addresses) remain constant across different newspaper articles on the same topic or on the same day. Articles are clustered using an existing information retrieval system into, for example, "murder" or "personnel" groupings or clusters. Named entities are annotated using a statistical tagger, and the data is then subjected to morphological and syntactic analysis to produce syntactic dependency trees. Within each cluster, sentences are clustered based on the named entities they contain. For instance, the following sentences are clustered because they share the same four named entities:

Vice President Osamu Kuroda of Nihon Yamamuri Glass Corp. was promoted to President.

Nihon Yamamuri Glass Corp. decided the promotion of Vice President Osamu Kuroda to President on Monday.

Given the overlap in named entities, these sentences are assumed to be linked by a paraphrase relationship. Shinyama et al. then attempts to identify patterns that link these sentences using existing machinery from the field of information extraction.

Shinyama et al. also attempt to learn very simple phrase level patterns, but the technique is limited by its reliance on named entity anchor points. Without these easily identified anchors, Shinyama et al. can learn nothing from a pair of sentences. The patterns that Shinyama et al. learn all center on the relationship between a particular type of entity and some type of event within a particular domain. The results are fairly poor, particularly when the training sentences contain very few named entities.

Another article also deals with paraphrases. In Barzilay R. and L. Lee, *LEARNING TO PARAPHRASE: AN UNSUPERVISED APPROACH USING MULTIPLE-SEQUENCE ALIGNMENT*, Proceedings of HLT/NAACL: (2003), Edmonton, Canada, topic detection software is used to cluster thematically similar newspaper articles from a single source, and from several years worth of data. More specifically, Barzilay et al. attempts to identify articles describing terrorist incidents. They then cluster sentences from these articles in order to find sentences that share a basic overall form or that share multiple key words. These clusters are used as the basis for building templatic models of sentences that allow for certain substitutional elements. In short, Barzilay et al. focuses on finding similar descriptions of different events, even events which may have occurred years apart. This focus on grouping sentences by form means that this technique will not find some of the more interesting paraphrases.

Also Barzilay and Lee require a strong word order similarity in order to class two sentences as similar. For instance, they may not class even active/passive variants of an event description as related. The templatic paraphrase relationships learned by Barzilay et al. are derived from sets of sentences that share an overall fixed word order. The paraphrases learned by the system amount to regions of flexibility within this larger fixed structure. It should also be noted that Barzilay and Lee appear to be alone in the literature in proposing a generation scheme. The other work discussed in this section is aimed only at recognizing paraphrases.

Another paper, Barzilay and McKeown *Extracting Paraphrases From a Parallel Corpus*, Proceedings of ACL/EACL (2001), relies on multiple translations of a single source document., However, Barzilay and McKeown specifically distinguish their work from machine translation techniques. They state that without a complete match between words in related sentences, one is prevented from using "methods developed in the MT community based on clean parallel corpora." Thus, Barzilay and McKeown reject the idea that standard machine translation techniques could be applied to the task of learning monolingual paraphrases.

Another prior art system also deals with paraphrases. This system relies on multiple translations of a single source to build finite state representations of paraphrase relationships. B. Pang, K. Knight, and D. Marcu, *SYNTAX BASED ALIGNMENT OF MULTIPLE TRANSLATION: EXTRACTING PARAPHRASES AND GENERATING NEW SENTENCES*, Proceedings of NAACL-HLT, 2003.

Still another prior reference also deals with paraphrase recognition. Ibrahim, Ali, *EXTRACTING PARAPHRASES FROM ALIGNED CORPORA*, Master Thesis, MIT (2002), located at HTTP://www.ai.mit.edu/people/jimmylin/papers/ibrahim0 2.pdf. In his thesis, Ibrahim indicates that sentences are "aligned" or subjected to "alignment" and that paraphrases are identified. However, the term "alignment" as used in the thesis means sentence alignment instead of word or phrase alignment and does not refer to the conventional word and phrase alignment performed in machine translation systems. Instead, the alignment discussed in the thesis is based on the following paper, which attempts to align sentences in one language to their corresponding translations in another:

Gale, William, A. and Church, Kenneth W., *A PROGRAM FOR ALIGNING SENTENCES IN BILINGUAL CORPORA*, Proceedings of the Associations for Computational Linguistics, Pages 177-184 (1991). Ibrahim uses this algorithm to align sentences within multiple English translations of, for example, Jules Verne novels. However, sentence structure can vary dramatically from translation to translation. What one translator represents as a single long sentence, another might map to two shorter ones. This means that the overall number of sentences in the different translations of a single novel don't match, and some sort of automated sentence alignment procedure is needed to identify equivalent sentences. The overall technique Ibrahim uses for extracting paraphrases from these aligned monolingual sentences is derived from the multiple-translation concepts set forth in the Barzilay, McKeown reference, plus a variation on the DIRT framework described by Lin et al.

SUMMARY OF THE INVENTION

The present invention obtains a set of text segments from a plurality of different articles (a cluster of articles) written about a common event. The text segments in the set are then subjected to word/phrase alignment techniques to identify paraphrases. A decoder can be used to generate paraphrases from the text segment pairs.

In one embodiment, the sources of the set of text segments are different articles written about the same event in a period of time closely proximate one another. The text segments can, for instance, be specific sentences extracted from those articles. For instance, it has been found that the first two sentences of news articles written about the same event, at approximately the same time, often contain very similar information. Therefore, in one embodiment, the first two sentences of a plurality of different articles written about the same event at approximately the same time are clustered together and used as the source of sentence sets. Of course, multiple clusters of articles can be formed where a relatively large number of articles are written about a variety of different events, and where each cluster comprises a group of articles written about the same event.

In one embodiment, the text segments in a given set of text segments derived from a cluster of articles are then paired against other text segments in that set, and word/phrase alignment (or machine translation) techniques are used to identify paraphrases given the paired text segments as inputs. While word/phrase alignment systems typically work on text segments in different languages, in accordance with one embodiment of the present invention, the alignment system is working on text segments in a common language. The text segments are simply viewed as different ways of saying the same thing.

In one embodiment, the text segment sets can be filtered using heuristic or other filtering techniques. In still another embodiment, the models generated to identify paraphrases in the word/phrase alignment system are also used to identify paraphrases in subsequent training data.

In accordance with another embodiment of the present invention, a decoding algorithm is used to generate paraphrases given the paraphrases and models output by the alignment system.

DETAILED DESCRIPTION OF ILLUSTRATIVE EMBODIMENTS

The present invention deals with identifying and potentially generating paraphrase relationships using word/phrase alignment techniques. However, prior to discussing the present invention in greater detail, one illustrative environment in which the present invention can be used will be discussed.

Figure 1:
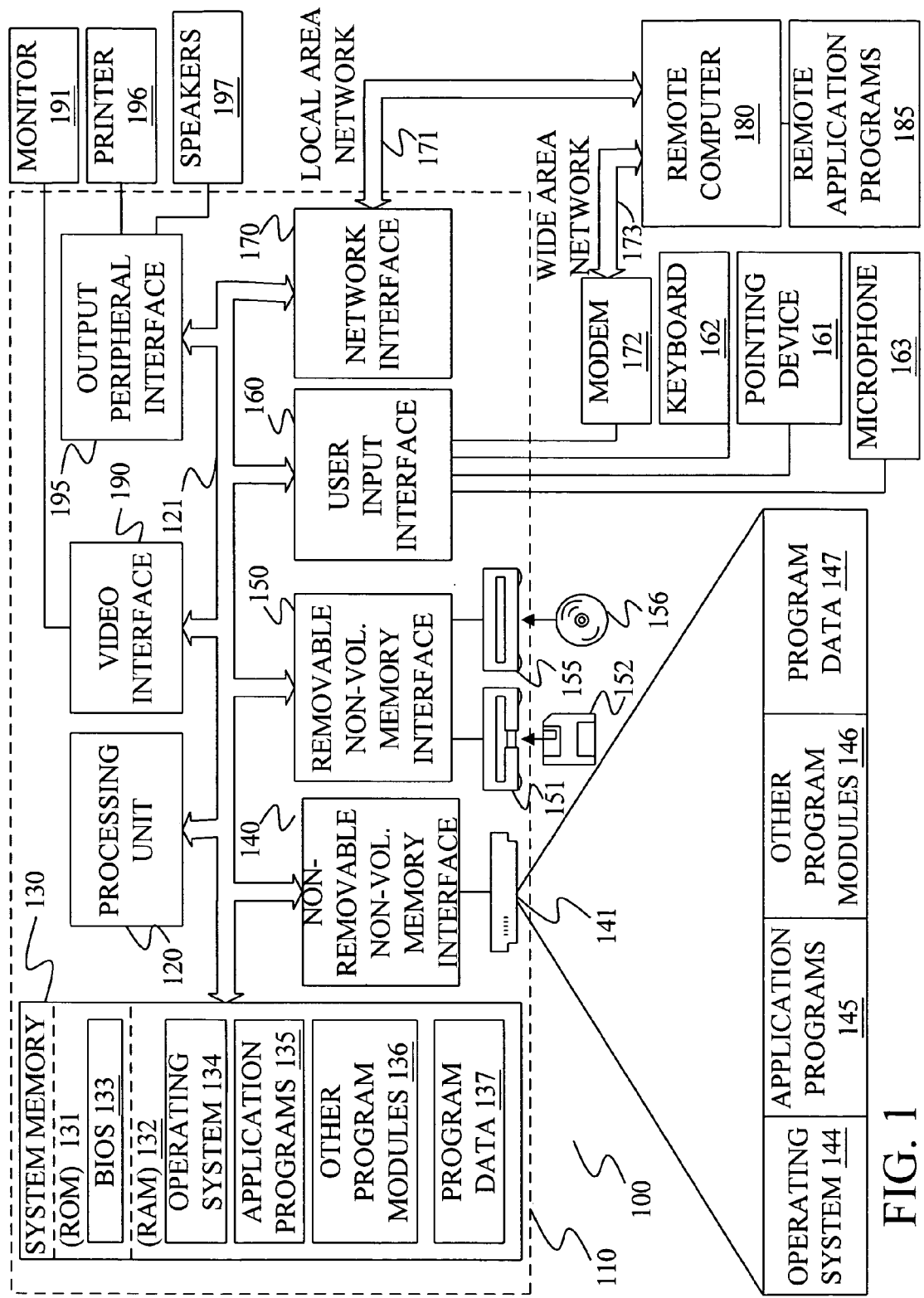
FIG. 1 is a block diagram of one embodiment of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both locale and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a locale area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
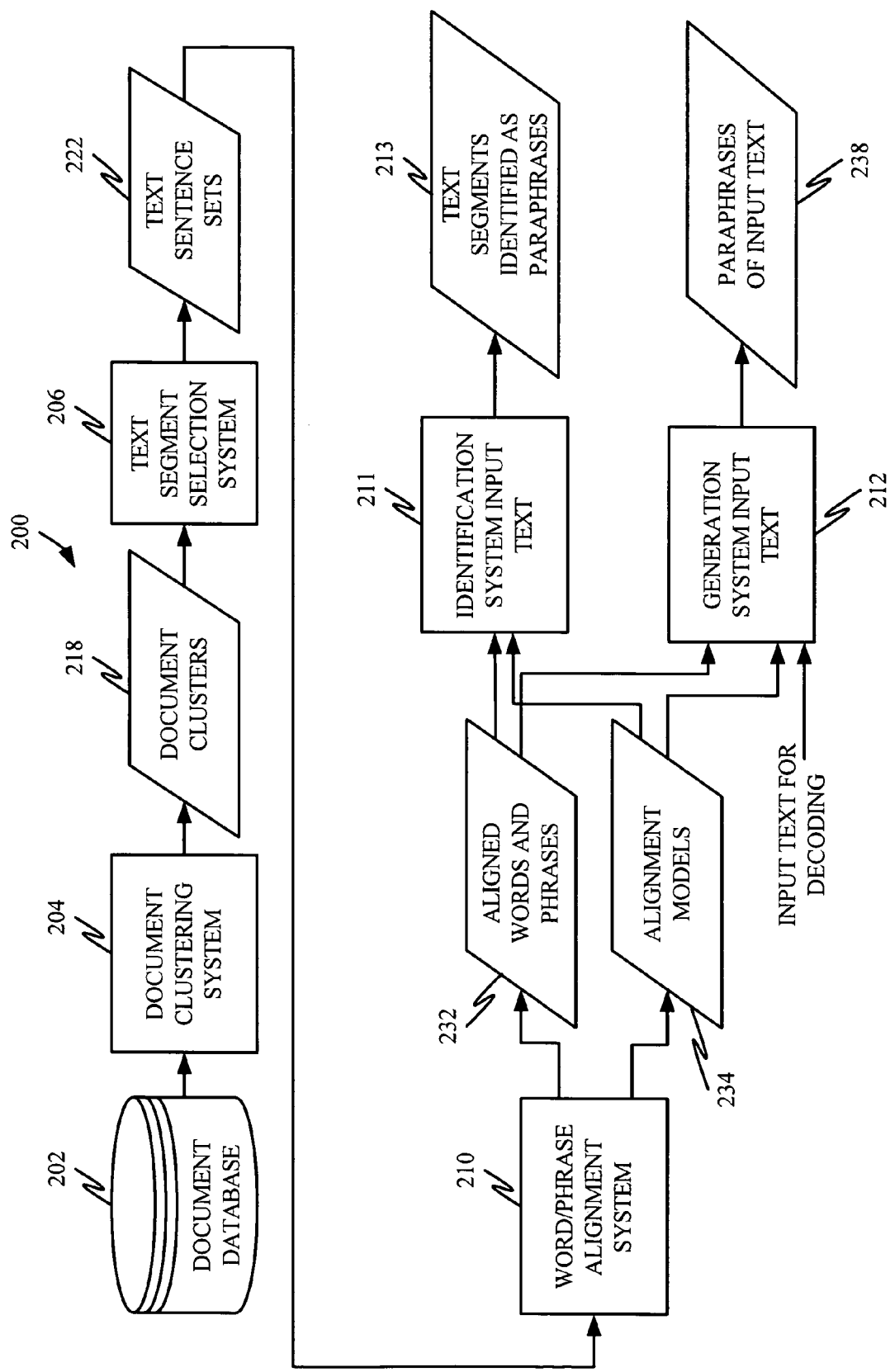
FIG. 2 is a block diagram of a paraphrase recognition and generation system in accordance with one embodiment of the present invention.
Figure 3:
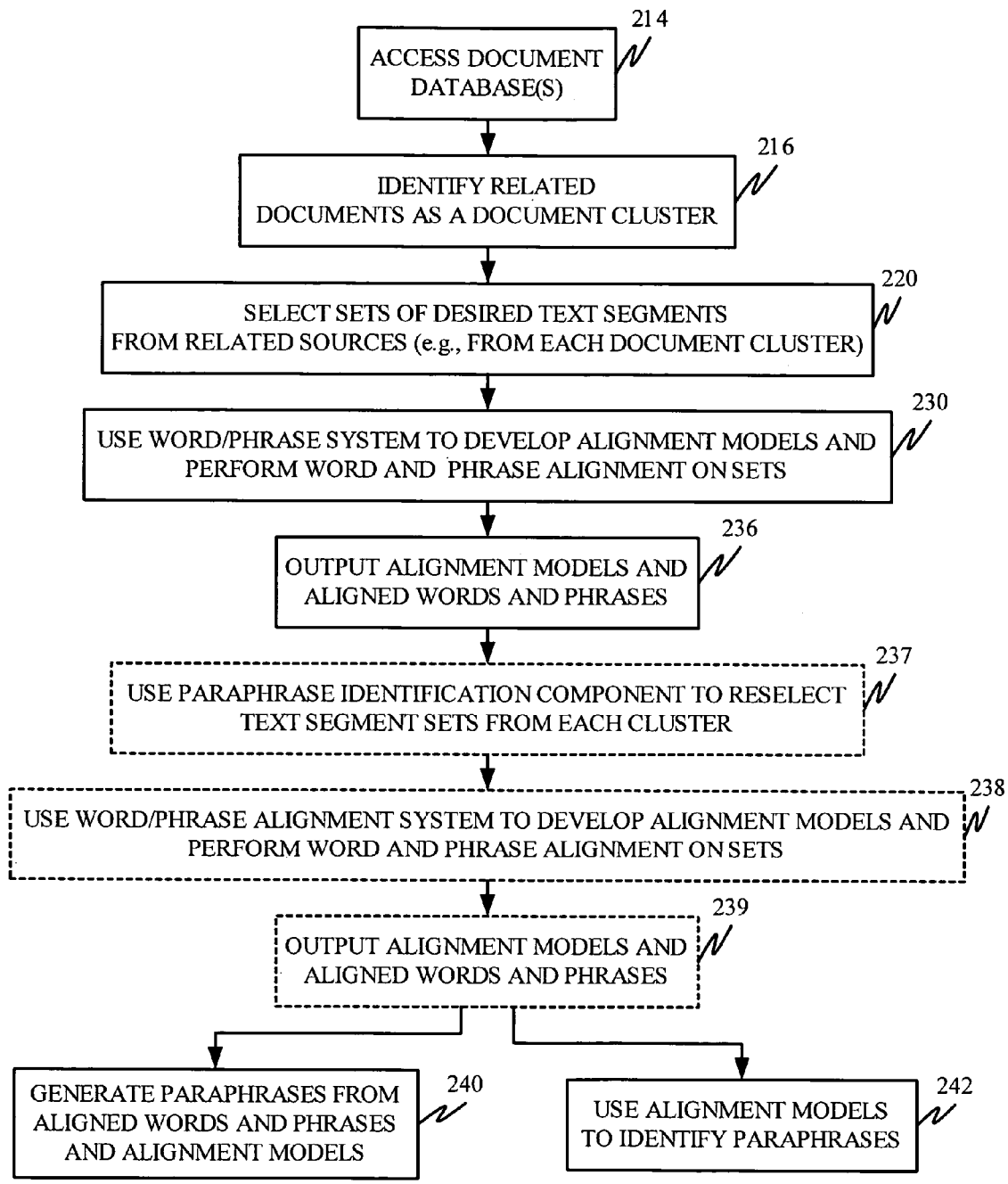
FIG. 3 is a flow chart illustrating the operation of the system shown in FIG. 2.

FIG. 2 is a block diagram of one embodiment of a paraphrase processing system 200. System 200 has access to a document database 202 and includes a document clustering system 204, text segment selection system 206, word/phrase alignment system 210, identification system input text 211 and generation system input text 212. FIG. 3 is a flow diagram illustrating the operation of system 200 shown in FIG. 2.

Document database 202 illustratively includes a variety of different news articles written by a variety of different news agencies. Each of the articles illustratively includes a time stamp indicating approximately when the article was authored. Also, the plurality of articles from the different news agencies will illustratively be written about a wide variety of different events.

Of course, while the present invention is described with respect to news articles, other source documents could be used as well, such as technical articles describing a common process, different medical articles describing a common medical procedure, etc.

Document clustering system 204 accesses document database 202 as illustrated by block 214 in FIG. 3. It should also be noted that while a single database 202 is illustrated in FIG. 2, a plurality of databases could be accessed instead.

Clustering system 204 identifies articles in document database 202 that are written about the same event. In one embodiment, the articles are also identified as being written at approximately the same time (such as within a predetermined time threshold of one another, e.g., one month, one week, one day, within hours, etc. . . . as desired). The articles identified as being written about the same event (and perhaps at about the same time) form a document cluster 218. This is indicated by block 216 in FIG. 3.

Once related source articles are identified as a cluster 218, desired, text segments (such as sentences, phrases, headlines, paragraphs, etc.) in those articles are extracted. For instance, a journalistic convention in news articles advises that the first 1-2 sentences of the article represent a summary of the rest of the article. Therefore, in accordance with one embodiment of the present invention, the articles (which were illustratively written by different news agencies) are clustered into clusters 218 and provided to text segment selection system 206 where the first two sentences of each article, in each cluster 218, are extracted. While the present discussion proceeds with respect to sentences, it will be noted that this is exemplary only and other text segments could just as easily be used. The sentences from each cluster 218 of articles are output as a sentence set 222 corresponding to the clustered articles. The sentence sets 222 are output by text segment selection system 206 to word/phrase alignment system 210. This is indicated by block 220 in FIG. 3.

In the specific example in which sentences are used, many of the sentences gathered in this way appear to be versions of some single original source sentence, slightly rewritten by editors at different news agencies for stylistic reasons. Frequently, these sets of sentences have been observed to differ only in small ways, such as the order of the clauses appearing in the sentence.

Text segment selection system 206 generates sets 222 of sentences for each cluster. It should be noted that the word/phrase alignment system 210 can operate on large sets of sentences by extracting mappings between words or phrases based on a holistic examination of the sentences in the set. However, the present discussion proceeds with respect to generating sentence pairs and performing alignment on those pairs, as but one illustrative embodiment. Thus, in one embodiment, the identified sets of sentences are formed into pairs of sentences. Therefore, text segment selection system 206 pairs each sentence in a set against every other sentence in that set to generate sentence pairs for each set. The sentence pairs are in one embodiment, subjected to an optional filtering step, and in another embodiment, are output directly to word/phrase alignment system 210. While the filtering will be described with respect to the present embodiment, it will be noted that the steps associated with filtering are optional.

In one illustrative embodiment, text segment selection system 206 implements a heuristic that filters the sentence pairs based on shared key content words. For example, in one illustrative embodiment, system 206 filters the sentence pairs, removing those sentence pairs that do not share at least three words of at least four characters each. Of course, filtering is optional, and, if used, the filtering algorithm implemented can vary widely. Any of a variety of different filtering techniques can be used, such as filtering on past results (which requires a feedback loop in the output of word/phrase alignment system 210 back to text segment selection system 206), filtering on different numbers of content words, filtering on other semantic or syntactic information, etc. In any case, the sets of sentences can be paired and can be filtered and provided to word/phrase alignment system 210.

In one illustrative embodiment, the word/phrase alignment system 210 implements a conventional, word/phrase alignment algorithm from the statistical machine translation literature in an attempt to learn lexical correspondences between the sentences in the sets 222. For instance, assume that the two following sentences are input to machine translation system 210 as a sentence pair:

Storms and tornadoes killed at least 14 people as they ripped through the central U.S. States of Kansas and Missouri.

A swarm of tornadoes crashed through the Midwest, killing at least 19 people in Kansas and Missouri.

These sentences may have a common editorial source, despite some differences. In any case, they were illustratively written by two different news agencies about the same event, at approximately the same time. Differences in the sentences include "ripped through" corresponding to "crashed through", differences in clausal order, "central U.S. States" corresponding to "Midwest", a morphological difference between the words "killed" and "killing" and a difference in the number of reported victims.

Figure 4:
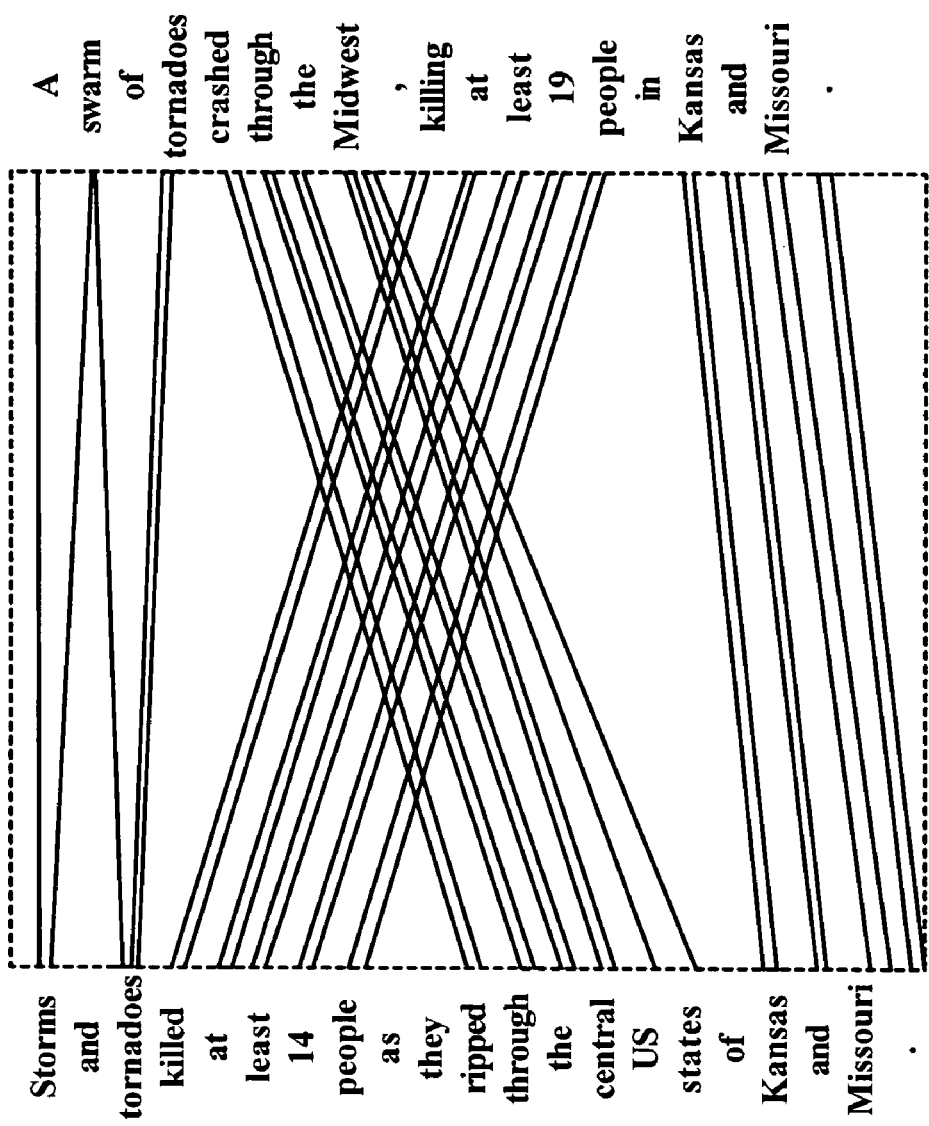
FIG. 4 illustrates one exemplary alignment between two paired sentences in accordance with one embodiment of the present invention.

FIG. 4 illustrates correspondences between words and multiple word phrases in the sentences, after the words and phrases have been aligned according to a conventional alignment system 210. For most of the correspondences, the statistical alignment algorithm has established links between the different but parallel pieces of information, as shown by the lines connecting words. For instance, the noun phrases "storms and tornadoes" and "a swarm of tornadoes" are not directly comparable. Therefore, as more data is acquired, the links between "storms" and "swarm" and the links between "storms" and "a" will fade. The difference in clausal order can be seen by the crossing pattern of links between the two sentences.

In one illustrative embodiment, word/phrase alignment system 210 is implemented using techniques set out in P. F. Brown et al., *The Mathematics of Statistical Machine Translation: Parameter Estimation*, Computational Linguistics, 19:263-312, (June 1993). Of course, other machine translation or word/phrase alignment techniques can be used for identifying associations between words and the input text. Using an alignment system 210 to develop alignment models and perform statistical word and/or phrase alignment on sentence sets is indicated by block 230 in FIG. 3.

Word/phrase alignment system 210 then outputs the aligned words and phrases 232, along with the alignment models 234 which it has generated based on the input data. Basically, in the above-cited alignment system, models are trained to identify word correspondences. The alignment technique first finds word alignments between words in text segments, as illustrated by FIG. 4. Next, the system assigns a probability to each of the alignments and optimizes the probabilities based on subsequent training data to generate more accurate models. Outputting the alignment models 234 and the aligned words and phrases 232 is illustrated by block 236 in FIG. 3.

The alignment models 234 illustratively include conventional translation model parameters such as the translation probabilities assigned to word alignments, movement probabilities indicative of a probability that the word or phrase moves within a sentence, and a fertility probability indicative of a likelihood or probability that a single word can correspond to two different words in another text segment.

Blocks 237, 238 and 239 are optional processing steps used in boot strapping the system for training itself. They are described in greater detail below with respect to FIG. 2A.

In the embodiment in which bootstrapping is not used, system 211 receives the output of system 210 and identifies words, phrases or sentences that are paraphrases of one another. The identified paraphrases 213 are output by system 211. This is indicated by block 242 in FIG. 3.

The aligned phrases and models can also be provided to generation system input text 212. System 212 is illustratively a conventional decoder that receives, as an input, words and/or phrases and generates a paraphrase 238 for that input. Thus, system 212 can be used to generate paraphrases of input text using the aligned words and phrases 232 and the alignment models 234 generated by alignment system 210. Generating paraphrases for input text based on the aligned words and phrases and the alignment models is indicated by block 240 in FIG. 3. One illustrative generation system is set out in Y. Wang and A. Waibel, *Decoding Algorithm in Statistical Machine Translation*, Proceedings of 35th Annual Meeting of the Association of Computational Linguistics (1997).

Figure 2A:
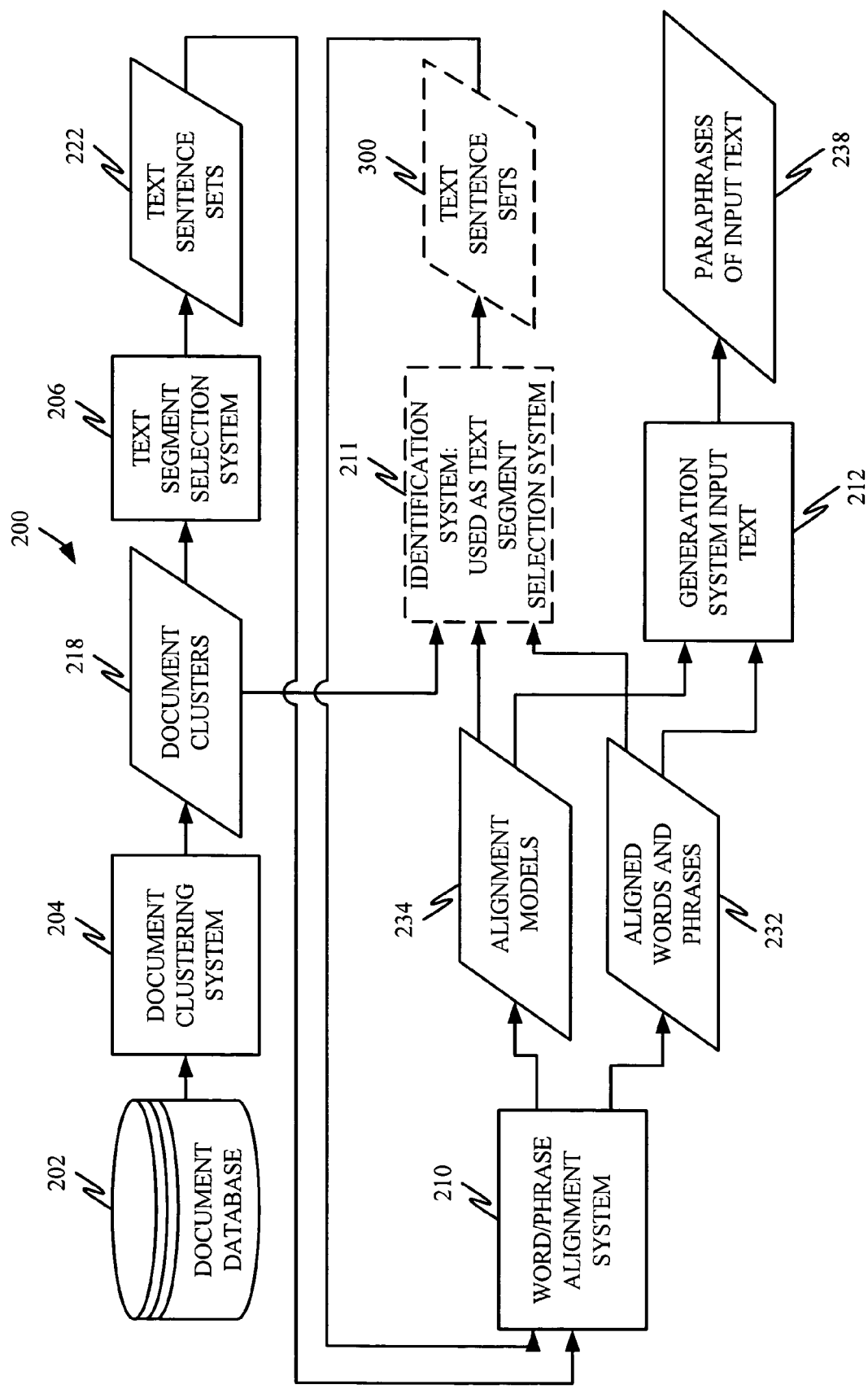
FIG. 2A illustrates using the paraphrase recognition component to select paraphrased sets of text segments for use in training.

FIG. 2A is similar to FIG. 2 except that identification system 211 is also used to bootstrap training. This is further illustrated by blocks 237-239 in FIG. 3. For instance, assume that word/phrase alignment system 210 has output alignment models 234 and aligned words and phrases 232 as described above with respect to FIGS. 2 and 3. Now, however, the entire text of each document cluster 218 is fed to identification system 211 for identifying a supplementary sentence set 300 (again, sentences are used by way of example only, and other text segments could be used as well) for use in further training the system. Identification system 211, with alignment models 234 and aligned words and phrases 232, can process the text in the clustered documents 218 to re-select sentence sets 300 from each of the clusters. This is indicated by block 237. The re-selected sentence sets 300 are then provided to word/phrase alignment system 210 which generates or recomputes alignment models 234 and aligned words and phrases 232 and their associated probability metrics based on the re-selected sentence sets 300. Performing word and phrase alignment and generating the alignment models and aligned words and phrases on the re-selected sentence sets is indicated by blocks 238 and 239 in FIG. 3.

Now, the re-computed alignment models 234 and the new aligned words and phrases 232 can again be input into identification system 211 and used by system 211 to again process the text in document clusters 218 to identify new sentence sets. The new sentence sets can again be fed back into word/phrase alignment system 210 and the process can be continued to further refine training of the system.

There are a wide variety of applications for paraphrases processed using the present system. For example, the potential applications for paraphrase processing systems include both a question answering system such as that set out in the background, and a more general information retrieval system. Such a system can generate a paraphrase score to determine similarity of two textual segments in returning a document set based on a query. Similarly, such a system can use paraphrase generation capability to perform query expansion (produce multiple forms of a single, original query) in order to find better matching results or to improve recall.

Still other applications for paraphrase recognition and generation include the summarization of multiple documents. By utilizing paraphrase recognition, an automatic document summarization system can find similar passages in different documents to decide the most salient information in the document set in order to generate a summary.

Another application for paraphrase recognition and generation is a dialog system. Such a system can generate a response that echoes the input, but is phrased differently to avoid parroting back the exact same input. This renders the dialog system more natural or conversational sounding.

Paraphrase recognition and generation can also be used in word processing systems. The word processing system can be used to generate stylistic rewrites automatically, and propose those rewrites to the user. This may be helpful, for instance, where a user is authoring a document and has repeated a phrase a large number of times, perhaps even in a single paragraph. Similarly, a word processing system might include a feature that flags repeated (but differently phrased)

information that is spread throughout a document. Similarly, such a system may include a feature that rewrites a piece of prose as a paraphrase.

The present invention can also be used in command and control systems. People conventionally ask for things using widely varying terminology. Identifying paraphrases allows such a system to implement the proper command and control actions even if the inputs are phrased in varying ways.

Thus, in accordance with one embodiment of the present invention, text sources describing a common event are clustered. Predefined text segment in those text sources are extracted into sets of text segments. The text segment in each set are provided to an alignment system to identify paraphrases. Thus, the present invention is identifying paraphrases across multiple clusters. The paraphrase relationships identified may be found using text segment pairs in many different clusters. In addition, in one embodiment, the paraphrases found are then used to find more paraphrase relationships during later training processes. This is highly advantageous over the prior paraphrase recognition systems.

Although the present invention has been described with reference to particular embodiments, workers skilled in the art will recognize that changes may be made in form and detail without departing from the spirit and scope of the invention.

What is claimed is:

1. A method of training a paraphrase processing system, comprising:
   i. accessing a plurality of documents;
   ii. identifying, from the plurality of documents, a cluster of related texts that are written by different authors about a common subject, wherein the related texts are further identified as being from different news agencies and about a common event;
   iii. receiving the cluster of related texts;
   iv. selecting a set of text segments from the cluster, wherein selecting comprises grouping desired text segments of the related texts into a set of related text segments;
   v. using textual alignment to identify paraphrase relationships between texts in the text segments included in the set of related text segments; and
   vi. wherein textual alignment comprises:
   using statistical textual alignment to align words in the text segments in the set; and
   identifying the paraphrase relationships based on the aligned words.

2. The method of claim 1 and further comprising:
   calculating an alignment model based on the paraphrase relationships identified.

3. The method of claim 2 and further comprising:
   receiving an input text; and
   generating a paraphrase of the input text based on the alignment model.

4. The method of claim 1 and wherein selecting a set of text segments comprises: selecting text segments for the set based on a number of shared words in the text segments.

5. The method of claim 1 wherein identifying a cluster of related texts comprises identifying texts written within a predetermined time of one another.

6. The method of claim 1 wherein grouping desired text segments comprises grouping a first predetermined number of sentences of each news article in each cluster into the set of related text segments.

7. The method of claim 6 wherein selecting a set of text segments comprises: pairing each sentence in a given set of related text segments with each other sentence in the given set.

* * * * *

UNITED STATES PATENT AND TRADEMARK OFFICE
CERTIFICATE OF CORRECTION

| | | |
|---|---|---|
| PATENT NO. | : 7,412,385 B2 | Page 1 of 1 |
| APPLICATION NO. | : 10/706102 | |
| DATED | : August 12, 2008 | |
| INVENTOR(S) | : Christopher J. Brockett et al. | |

It is certified that error appears in the above-identified patent and that said Letters Patent is hereby corrected as shown below:

Title Page;

In Face page, in field (54), under "Title" column 1, line 2, after "TRANSLATION" insert -- TECHNIQUES --.

In column 1, line 2, after "TRANSLATION" insert -- TECHNIQUES --.

Signed and Sealed this
Twenty-fourth Day of May, 2011

David J. Kappos
*Director of the United States Patent and Trademark Office*